(12) United States Patent
Mickelson

(10) Patent No.: US 8,740,238 B2
(45) Date of Patent: Jun. 3, 2014

(54) FIBER-REINFORCED WRAPPED HANDLEBAR-STEERED SUSPENSION FORK

(75) Inventor: Craig S. Mickelson, Monument, CO (US)

(73) Assignee: SRAM, LLC, Chicago, IL (US)

( * ) Notice: Subject to any disclaimer, the term of this patent is extended or adjusted under 35 U.S.C. 154(b) by 1706 days.

(21) Appl. No.: 11/847,174

(22) Filed: Aug. 29, 2007

(65) Prior Publication Data

US 2009/0058039 A1 Mar. 5, 2009

(51) Int. Cl.
*B62K 19/02* (2006.01)

(52) U.S. Cl.
USPC .......................................................... 280/278

(58) Field of Classification Search
USPC .......................................... 280/274–277, 279
See application file for complete search history.

(56) References Cited

U.S. PATENT DOCUMENTS

| | | | | |
|---|---|---|---|---|
| 4,971,344 | A * | 11/1990 | Turner | 280/276 |
| 5,078,417 | A | 1/1992 | Mouritsen | |
| 5,131,651 | A * | 7/1992 | You | 473/520 |
| 5,188,384 | A * | 2/1993 | van Raemdonck | 280/281.1 |
| 6,012,996 | A * | 1/2000 | Lo | 473/547 |
| 6,036,610 | A * | 3/2000 | Lewark | 473/564 |
| 6,168,179 | B1 * | 1/2001 | Yu | 280/274 |
| 6,869,372 | B1 * | 3/2005 | Higginbotham et al. | 473/566 |
| 7,597,338 | B2 * | 10/2009 | I et al. | 280/281.1 |
| 2004/0089416 | A1 * | 5/2004 | Lussier et al. | 156/292 |
| 2005/0248119 | A1 | 11/2005 | Callahan et al. | |

FOREIGN PATENT DOCUMENTS

| | | |
|---|---|---|
| CN | 2458229 Y | 11/2001 |
| DE | 29707546 | 1/1998 |
| JP | 62143785 | 6/1987 |
| JP | 62037138 | 8/1987 |
| JP | 2005180673 | 7/2005 |
| JP | 2006347386 | 12/2006 |
| JP | 2007211790 | 8/2007 |
| TW | M312489 | 5/2007 |
| TW | M270111 | 7/2007 |

OTHER PUBLICATIONS

Winwood DeeDee 29" Carbon Suspension Fork Owner's Manual, 2004, p. 1.
VeloNews Website, Apr. 15, 2007, Matt Pacocha, "Tech Report, with Matt Pacocha—New Developments at (at very wet) Sea Otter," p. 3.
English abstract of CN 2458229 Y.

* cited by examiner

*Primary Examiner* — Tony Winner
(74) *Attorney, Agent, or Firm* — MIlan Milosevic; Lisa Serdynski; Steven Courtright

(57) ABSTRACT

A handlebar-steered suspension fork that includes an outer tube and an inner tube reciprocally slidable within the outer tube. The outer tube includes at least one radial load region and at least one transition region. A fiber-reinforced material is wrapped about at least one of the outer tube radial load regions and not wrapped about at least one of the outer tube transitions regions.

8 Claims, 3 Drawing Sheets

FIBER-REINFORCED WRAPPED HANDLEBAR-STEERED SUSPENSION FORK

BACKGROUND OF THE INVENTION

The present invention relates to handlebar-steered suspension forks, and more particularly, to a handlebar-steered suspension fork that includes a fiber-reinforced material wrapped about radial load regions of an outer tube of the fork and not wrapped about transition regions of the outer tube.

SUMMARY OF THE INVENTION

The strength of a handlebar-steered suspension fork may be increased by selectively wrapping the fork with a fiber-reinforced material according to one embodiment of the present invention. The handlebar-steered suspension fork includes an outer tube and an inner tube reciprocally slidable within the outer tube. The outer tube includes at least one radial load region and at least one transition region. A fiber-reinforced material is wrapped about at least one of the outer tube radial load regions and not wrapped about at least one of the outer tube transition regions.

In one embodiment of the present invention, the fork includes a bushing disposed between the outer and inner tubes. The bushing is configured to transmit radial load from the inner tube to the radial load region of the outer tube. In another embodiment of the present invention, each of the outer tube radial regions is wrapped with the fiber-reinforced material.

These and other features and advantages of the present invention will be more fully understood from the following description of one or more embodiments of the invention, taken together with the accompanying drawings.

DETAILED DESCRIPTION

Figure 1:
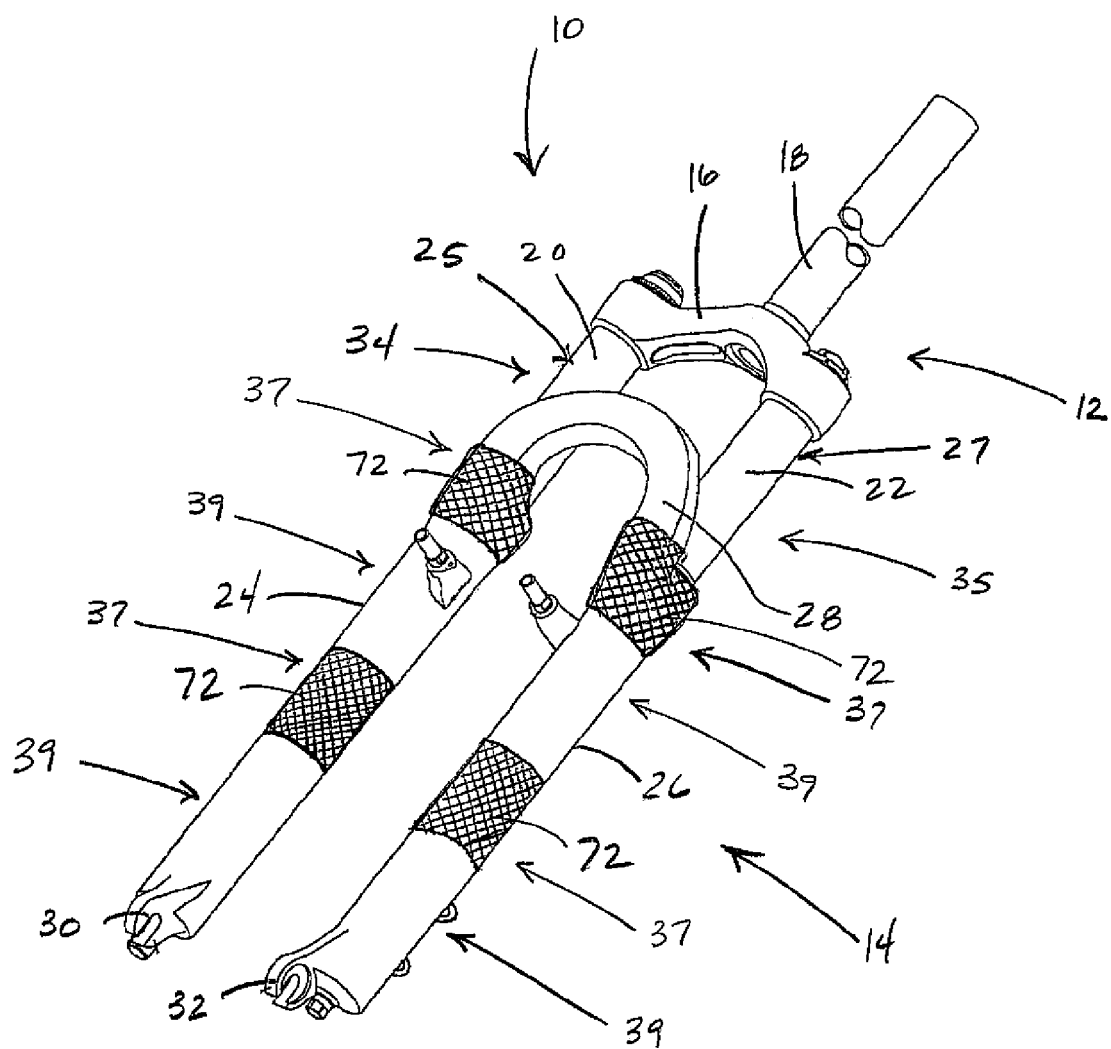
FIG. 1 is perspective view of a suspension fork according to one embodiment of the present invention.
Figure 2:
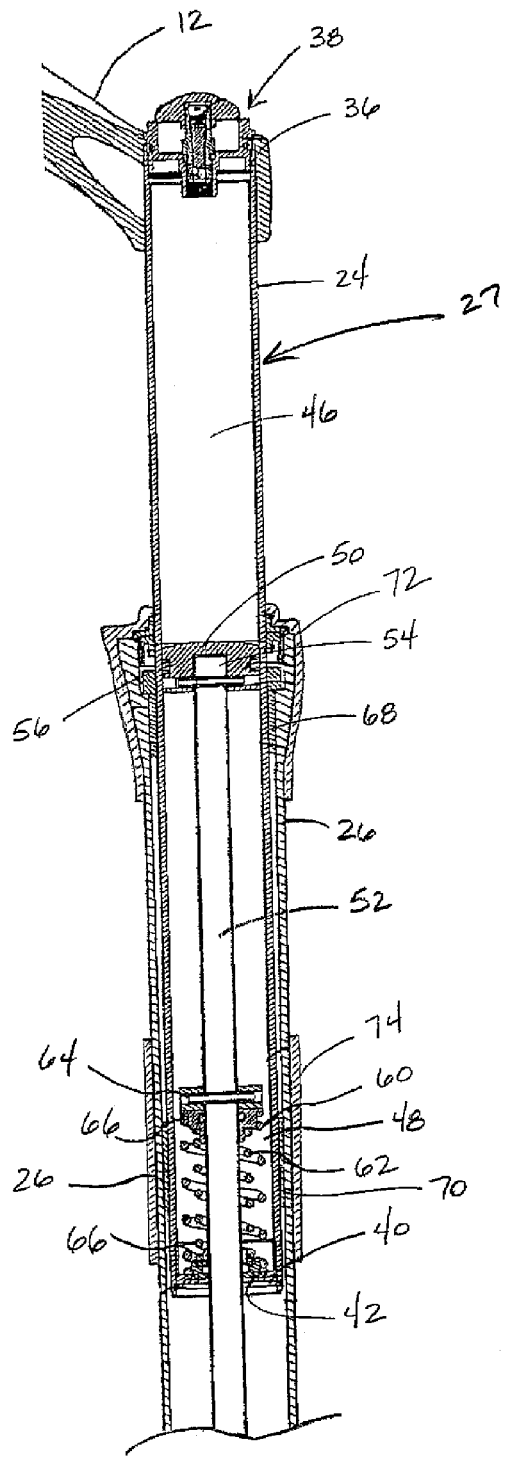
FIG. 2 is a partial cross-sectional view of a leg of the suspension fork of the FIG. 1.
Figure 3:
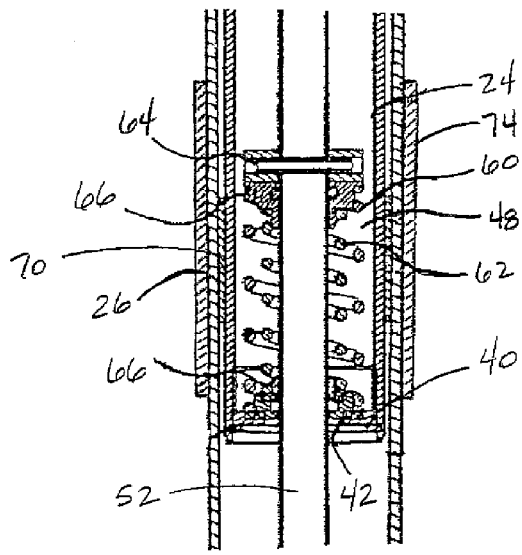
FIG. 3 is an enlarged view of a portion of the leg of FIG. 2.

FIGS. 1-3 illustrate a suspension fork 10 that includes fiber-reinforced material selectively wrapped about the fork 10 according to one embodiment of the present invention. Looking to FIG. 1, the suspension fork 10 includes an upper housing 12 and a lower housing 14. The upper housing 12 includes a crown 16 connected to a steerer tube 18 and inner tubes 20, 22. The lower housing 14 includes outer tubes 24, 26, an arch 28 and dropouts 30, 32. The arch 28 connects the outer tubes 24, 26 for increased rigidity of the lower housing 14. In this embodiment, the outer tubes 24, 26 and the arch 28 embody a single piece, however, the tubes 24, 26 and the arch 28 may be separate pieces fastened together. The dropouts 30, 32 connect the fork 10 to a wheel axle (not shown). The inner tubes 20, 22 are reciprocally slidable within the outer tubes 24, 26, respectively, each inner and outer tube pairing forming a leg 25, 27 of the suspension fork 10. The legs 25, 27 of the fork 10 may include a damping system 34 and a spring system 35. The outer tubes 24, 26 include radial load regions 37 and transition regions 39.

Looking to FIGS. 2 and 3, the leg 27 includes a first bushing 68 and a second bushing 70 positioned between the inner and outer tubes 24, 26. The bushings 68, 70 are configured to transmit radial load from the inner tube 24 to the radial load regions 37 of the outer tube 26. As the inner and outer tubes are loaded laterally with respect to the direction of suspension travel, the inner tube applies a radial or prying load to the outer tube, the outer tube resisting deflection under hoop and bending stress. To further resist the prying loads of the inner tube, without adding extraneous weight, a fiber-reinforced material 72 is selectively wrapped about the outer tube 26 at the radial load regions 37 of the outer tube 26 and not wrapped about the transition regions 39 of the outer tube 26. Further, the bushings 68, 70 inhibit wear of the inner and outer tubes 24, 26 by preventing direct contact therebetween. The bushings 68, 70 are typically fixed to the outer tube 26, but may alternatively be fixed to the inner tube 24.

Figure 4:
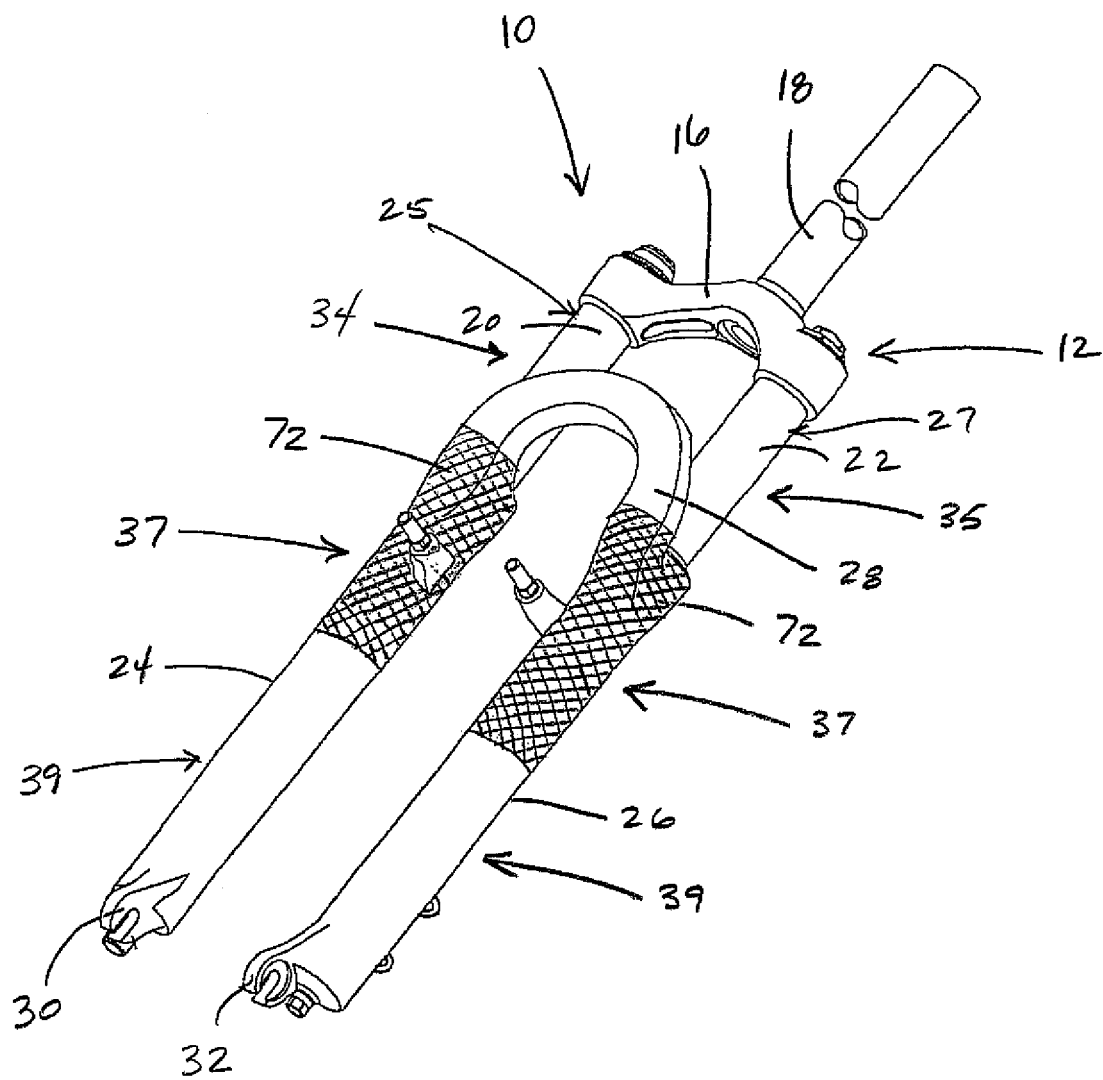
FIG. 4 is a perspective of view of a suspension fork according to another embodiment of the present invention.

In another embodiment of the present invention, typically in suspension forks with shorter travel, the fiber-reinforced material 72 may extend continuously between proximate or overlapping radial load regions 37 of the outer tube 26 (see FIG. 4). In similar embodiments, a single bushing may be used instead of paired bushings 68, 70.

The fiber-reinforced material 72 increases the hoop strength of the outer tube 26 in these radial load regions, resulting in greater stiffness and load capacity. Further, the fiber-reinforced material 72 supports the outer tube 26 during installation and sizing of the bushings 68, 70, thereby preventing splitting of the outer tube 26 and resulting in more stable bushing performance. The fiber-reinforced material may include various layers of materials. The inner-most layer may be an adhesive that bonds the wrap to the outer leg. The next layer may be a glass, insulative layer preventing galvanic corrosion with additional layers of unidirectional and/or weave materials for structural strength. Lastly, an outer-most layer may provide a cosmetic finished look. The structural layers may be carbon, glass, Kevlar or of a similar fibrous material.

While this invention has been described by reference to one or more embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A handlebar-steered suspension fork comprising:
   an outer tube;
   an inner tube reciprocally slidable within the outer tube, the outer tube including at least one radial load region and at least one transition region; and
   a fiber-reinforced material wrapped about at least one of the outer tube radial load regions, the fiber-reinforced material not wrapped about at least one of the outer tube transition regions.

2. The handlebar-steered suspension fork of claim 1, further comprising at least one bushing disposed between the outer and inner tubes, the bushing configured to transmit radial load from the inner tube to the radial load region of the outer tube, the fiber-reinforced material wrapped only about an exterior of the at least one of the outer tube radial load regions.

3. The handlebar-steered suspension fork of claim 2, wherein the fiber-reinforced material includes layers of one of unidirectional and weave materials for structural strength.

4. The handlebar-steered suspension fork of claim 1, wherein the fiber-reinforced material includes layers of one of unidirectional and weave materials for structural strength.

5. A handlebar-steered suspension fork comprising:
an outer tube;
an inner tube reciprocally slidable within the outer tube, the outer tube including at least one radial load region and at least one transition region; and
a fiber-reinforced material wrapped about each of the outer tube radial load regions, the fiber-reinforced material not wrapped about at least one of the outer tube transition regions.

6. The handlebar-steered suspension fork of claim 5, further comprising at least one bushing disposed between the outer and inner tubes, the bushing configured to transmit radial load from the inner tube to the radial load region of the outer tube, the fiber-reinforced material wrapped only about an exterior of each of the outer tube radial load regions.

7. The handlebar-steered suspension fork of claim 6, wherein the fiber-reinforced material includes layers of one of unidirectional and weave materials for structural strength.

8. The handlebar-steered suspension fork of claim 5, wherein the fiber-reinforced material includes layers of one of unidirectional and weave materials for structural strength.

* * * * *